United States Patent [19]

Maeda

[11] Patent Number: 4,772,972
[45] Date of Patent: Sep. 20, 1988

[54] MAGNETIC DISC APPARATUS WITH HEAD ASSEMBLY ALIGNING MECHANISM

[75] Inventor: Nobuaki Maeda, Amagasaki, Japan

[73] Assignee: Mitsubishi Denki Kabushiki Kaisha, Japan

[21] Appl. No.: 13,138

[22] Filed: Feb. 10, 1987

[30] Foreign Application Priority Data

Feb. 17, 1986 [JP] Japan .................................. 61-32244

[51] Int. Cl.$^4$ .............................................. G11B 5/012
[52] U.S. Cl. ...................................... 360/97; 360/106
[58] Field of Search .................................. 360/97–99, 360/106, 104

[56] References Cited

U.S. PATENT DOCUMENTS 4,064,545 12/1977 Goss .................................. 360/98 X
4,286,298 8/1981 Rinkleib .......................... 360/106 X

OTHER PUBLICATIONS

"Design of a Swinging Arm Actuator for a Disk File", IBM, J. Res. Develop, pp. 389–397.
"8 Inch Fixed Magnetic Disc Apparatus with a Thin Layer Head", Mitsubishi Technical Journal, vol. 59, No. 12, 1985, pp. 16–18.
A Development of 8 in. & 5.25 in. High Performance Disk Drivers; vol. 66, No. 8, 1984-8, pp. 5–7.

Primary Examiner—A. J. Heinz
Attorney, Agent, or Firm—Leydig, Voit & Mayer

[57] ABSTRACT

A magnetic disc apparatus comprises a base, a disc driving assembly and a head positioning assembly. The head positioning assembly is provided at the bottom portion thereof with a fitting recess and the base is provided at a top surface thereof with a corresponding projection, which, when the head positioning assembly is correctly aligned, fits into the recess in the head positioning assembly. By fitting the fitting projection into the fitting recess, the head positioning assembly is automatically positioned accurately on the base in a predetermined relational position with respect to the disc driving assembly, whereby the pivot axis of the head positioning assembly is positioned in a predetermined positional relationship with respect of the center shaft of the disc driving assembly.

5 Claims, 3 Drawing Sheets

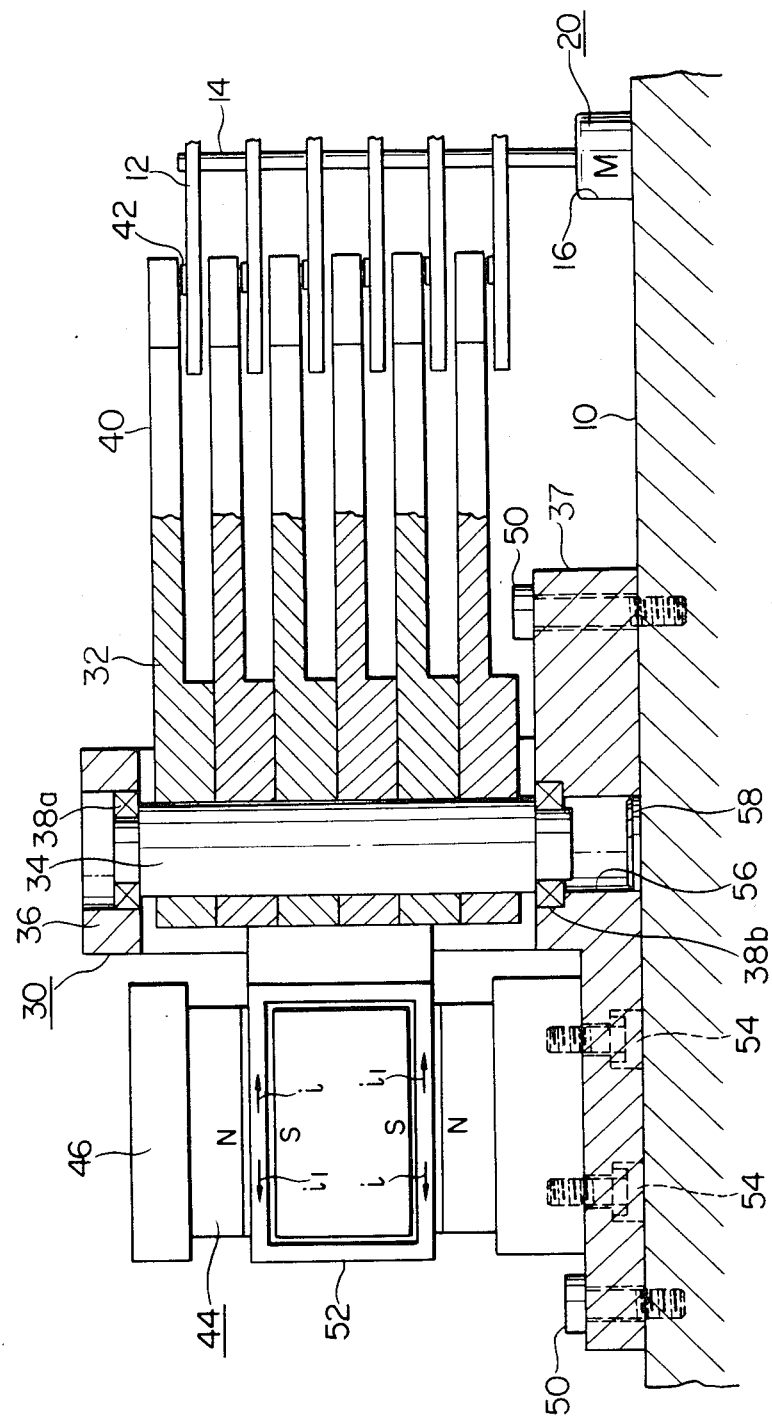

MAGNETIC DISC APPARATUS WITH HEAD ASSEMBLY ALIGNING MECHANISM

BACKGROUND OF THE INVENTION

The present invention relates to a magnetic disc apparatus, and more particularly to a magnetic head positioning assembly for use in a magnetic disc apparatus.

FIG. 1 illustrates, partly in section, one example of a conventional magnetic disc apparatus and FIG. 2 illustrates, in perspective, a magnetic head positioning assembly for use int he magnetic disc apparatus. Such a magnetic disc apparatus is disclosed in Japanese Patent Application Laid Open No. 58-220275.

Referring to the figures, the magnetic disc apparatus comprises a base 10, a magnetic disc driving assembly 20 mounted on the bae 10 for supporting and driving magnetic discs 12 thereon and a magnetic head positioning assembly 30 disposed on the base 10 in a predetermined positional relationship with respect to the magnetic disc driving assembly 20. The magnetic disc driving assembly 20 comprises a rotary shaft 14 for supporting magnetic discs 12 and a motor 16 for rotatably driving the rotary shaft 14. The magnetic head positioning assembly 30 comprises an arm assembly 32, a rotary shaft 34 to which the arm assembly 32 is secured, a housing 36 secured at the bottom portion 37 (see FIG. 2) thereof tot he base 10 by means of a plurality of set screws 50. The rotary shaft 34 is pivotaly mounted in the housing 36 through bearings 38a and 38b. The arm assembly 32 comprises arm members 40, each being provided at one end portion thereof with a magnetic head 42. The head positioning assembly further comprises a magnet assembly 44 disposed at an opposite side of the shaft 34 with respect to the arm assembly 32. Themagnet assembly 44 includes a magnet housing 46 having an E shaped magnet 48 housed therein and a coil assembly 52 of a linear D.C. motor, which is movably mounted on the center leg of the E shaped magnet 48. The magnet assembly 44 is mounted on the bottom portion 37 of the housing 36 of the head positioning assembly 30 by means of screws 54 from the bottom side thereof.

In the thus-constructed conventional apparatus, when a current i flows through the coil assembly 52, the coil assembly 52 is swung about the rotary shaft 34 due to an electromagnetic forge generated therein, and the arm assembly 32 is moved about the rotary shaft 34 as indicated by an arrow R or S in FIG. 2, as the coil assembly 52 is swung, so that the magnetic heads 42 are shifted to an objective track on the magnetic disc 12. Accordingly, when a current i is applied to the coil assembly 52 in one direction, the coil assembly 52 is swung in a first direction with respect to the case as indicated by the arrow S in FIG. 2, whereas when the current i is passed through the coil assembly 52 in the other direction, the magnetic heads 42 are shifted in the other direction as indicated by the arrow R in FIG. 2, i.e. toward the periphery of the magneti discs 12. Thus, the magnetic heads 42 can be moved to a desired position on the magnetic discs 12 to read and/or write data on the magnetic disc 12.

Such a conventional magnetic disc apparatus has problems in that it is difficult to accurately mount the head positioning assembly 30 on the base 10 in a predetermined positional relationship with respect to the disc driving assembly 20 during assembly of the magnetic disc apparatus. Therefore, the magnetic head positioning assembly 30 is first adjustably moved such that the pivot axis of the rotary shaft 34 is positioned in a predetermined positional relationship with respect tot he shaft center of the disc driving assembly 20 on the base 10. Then, a bore is made both in the bottom portion 37 of the housing 36 and the upper surface of the base 10. Finally, a bolt 50 is screwed into the bore to fixedly mount the assembly 30 on the base 10. Thus, assembly is both time consuming and troublesome.

SUMMARY OF THE INVENTION

Accordingly, an object of the present invention is to provide a magnetic disc apparatus free from the above discussed problems.

The magnetic disc apparatus according to the present invention comprises positioning means which is provided both in the bottom portion of the housing of a magnetic head positioning assembly and the base of a magnetic disc apparatus, the positioning means having a central axis in alignment with the pivot axis of the rotary shaft of the magnetic head positioning assembly.

According to the present invention, the positioning means allows the pivot axis of the rotary shaft of the head positioning assembly to be automatically positioned on the base of the magnetic disc apparatus in a predetermined positional relationship with respect to the center axis of the rotary shaft of the magnetic disc driving assembly, whereby the magnetic heads are accurately positioned in a predetermined position relative to the magnetic disc.

BRIEF DESCRIPTION OF THE DRAWINGS

The present invention will become more readily apparent from the following detailed description of the preferred embodiments of the invention taken in conjunction with the accompanying drawings, in which:

FIG. 3 is an elevational view, partly in section, of a magnetic disc apparatus according to the present invention.

DETAILED DESCRIPTION OF THE PREFERRED EMBODIMENTS

Figure 1:
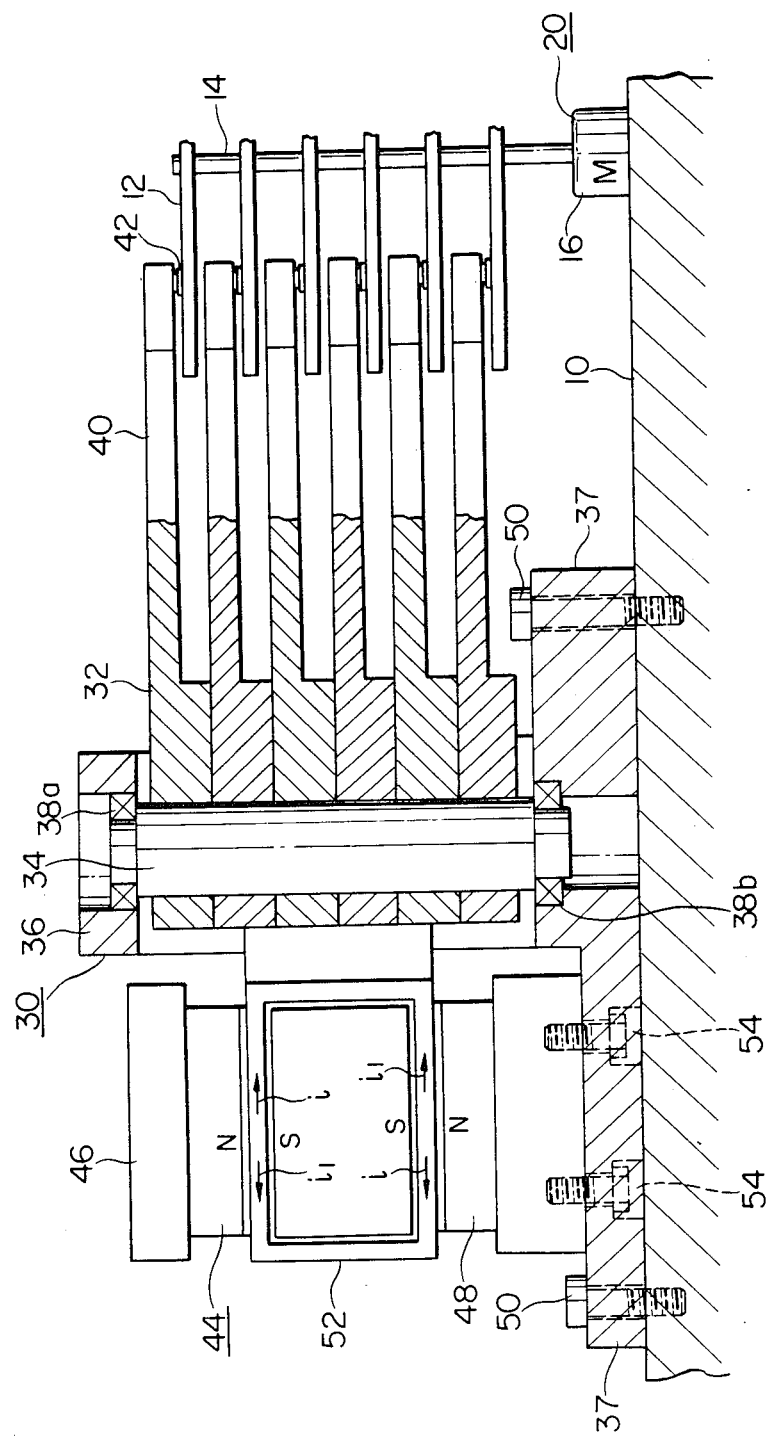
FIG. 1 is an elevational view, partly in section, of a conventional magnetic disc apparatus taken along line I—I of FIG. 2.
Figure 2:
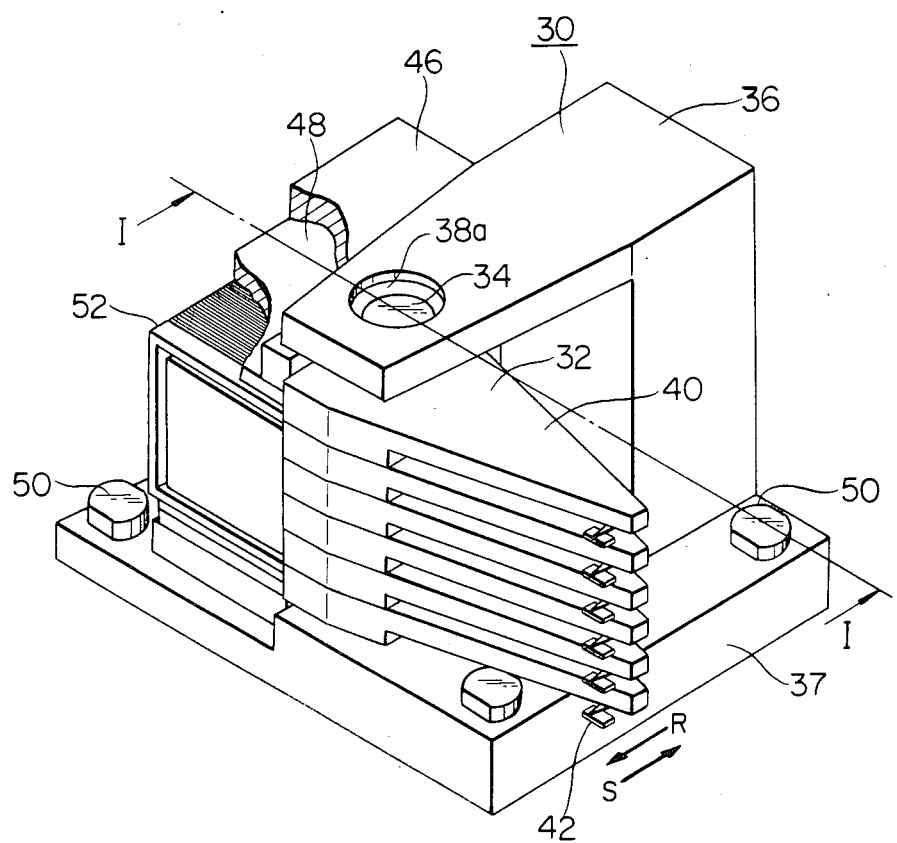
FIG. 2 is a perspective view of a head positioning assembly for use in the magnetic disc apparatus.

FIG. 3 illustrates a magnetic disc apparatus according to the present invention. The magnetic disc apparatus is substantially similar to the apparatus shown in FIG. 1 except for the fact that the former additionally comprises positioning means. In other respects, the structure is the same as that of the conventional apparatus illustrated in FIG. 1.

In the illustrated embodiment, according to the present invention, the magnetic disc apparatus includes means for positioning the head positioning assembly in a predetermined position on the base to obtain a predetermined positional relationship of the head positioning assembly relative to the magnetic disc driving assembly. The positioning means comprises a recess 56 and a fitting projection 58. The recess 56 is formed in the bottom portion of the housing of the head positioning assembly 30 and the fitting projection 58 is formed on the base 10 of the magnetic disc apparatus at a predetermined position relative to the disc driving assembly. The recess 56 and fitting projection 58, each has a central axis, which align with each other. The recess 56 may be machined simultaneously with the machining of a bore for the rotary shaft 34 of the arm assembly 32. The width of the recess 56 is slightly larger than that of the fitting projection 58 to the extent that the fitting projection 58 can be snugly and acurately fitted within the recess 56.

In order to assemble the head positioning assembly 30 on the base 10, the head positioning assembly 30 is placed on the base 10 of the magnetic disc apparatus in such a manner that the fitting projection 58 of the base 10 fits into the recess 56 of the arm assembly 32. Then, the head positioning assembly is secured at the bottom portion 37 of the housing 36 of the head positioning assembly 30 to the base 10 by means of set screws 50 so that the pivot axis of the rotary shaft 34 of the head positioning assembly 30 is automatically positioned in a predetermined positional relationship with the center axis of the discs.

According to the present invention, an engagement means is provided in both the housing 36 and the base 10 of the magnetic disc apparatus, so that, when the housing 36 is mounted on the base, the axis of the rotary shaft 34 is automatically positioned accurately with respect to the axis of the supporting shaft of the magnetic discs, resulting in facilitated assembly and better workability.

In the above embodiment, a recess 56 is formed in the bottom portion 37 of the housing 36 of the head positioning assembly 30 and a fitting projection 58 is formed in the base 10 of the magnetic disc apparatus, while, according to another embodiment of the present invention, a recess may be formed in the base 10 of the magnetic disc apparatus and a fitting projection formed in the bottom portion 37 of the housing 36 of the head positioning assembly 30.

According to still another embodiment of the present invention, the fitting means may be made in a polygonal shape, thereby further facilitating the positioning of the magnetic head in comparison to a round shaped fitting means.

According to still another embodiment of the present invention, recesses can be made both in the housing 36 of thehead positioning assembly and the base 10 of the magnetic disc apparatus, and a positioning pin can be inserted therein.

I claim:

1. A magnetic disc apparatus comprising:
a base,
a magnetic disc driving assembly mounted on said base for supporting and driving a magnetic disc thereon;
a magnetic head-positioning assembly mounted on said base and having a magnetic head mounted thereon, said head-positioning assembly being capable of moving the magnetic head in a predetermined position relative to said magnetic disc, said head-positioning assembly further comprising an arm assembly pivotally supporting the magnetic head about a pivot axis;
means disposed between said head-positioning assembly and said base for positioning, during assembly of the magnetic disc apparatus, said head-positioning assembly in a predetermined position on said base to obtain a predetermined positional relationship of said head-positioning assembly relative to said magnetic disc driving assembly, said positioning means having a central axis in alignment with the pivot axis of said arm assembly of said magnetic head positioning assembly.

2. An magnetic disc apparatus as claimed in claim 1 wherein said positioning means comprises a recess provided in one of said head positioning assembly and said base, and a fitting projection provided in the other of said head positioning assembly and said base, said fitting projection snugly fitting within said recess.

3. A magnetic disc apparatus as claimed in claim 2 wherein said fitting projection is a positioning pin inserted in a recess formed in said the other of said head positioning assembly and said base.

4. A magnetic disc apparatus as claimed in claim 2 wherein said fitting projection and recess having a polygonal cross section.

5. A magnetic disc apparatus as claimed in claim 1 wherein said fitting projection and recess have a polygonal cross section.

* * * * *